United States Patent [19]
Bulin

[11] 3,799,186
[45] Mar. 26, 1974

[54] DRAIN TUBE VALVE

[75] Inventor: Shelly A. Bulin, Bettendorf, Iowa

[73] Assignee: J. I. Case Company, Racine, Wis.

[22] Filed: Dec. 26, 1972

[21] Appl. No.: 318,168

[52] U.S. Cl. ............. 137/204, 137/433, 137/533.11
[51] Int. Cl. ..................... F16k 15/04, F16k 31/22
[58] Field of Search .......... 137/204, 183, 199, 396, 137/433, 449, 533.11, 533.13, 539, 55, 210

[56] References Cited
UNITED STATES PATENTS

| | | | |
|---|---|---|---|
| 2,496,470 | 2/1950 | Hodsdon | 137/204 |
| 2,682,281 | 6/1954 | Ecker | 137/533.13 |
| 3,082,465 | 3/1963 | Wood | 137/199 |
| 3,626,713 | 12/1971 | Venable | 137/525.1 |

*Primary Examiner*—William R. Cline
*Assistant Examiner*—George L. Walton
*Attorney, Agent, or Firm*—Arthur J. Hansmann

[57] ABSTRACT

A drain tube valve having an outer drain tube with two tubes disposed in spaced-apart relation along the axis of the drain tube and having a sphere therebetween. The two spaced-apart tubes have an inner diameter which is less than the diameter of the sphere so that the sphere can fluid-tightly seat upwardly against the lower edge of the upper one of the two tubes. The lower one of the two tubes has an oblique upper edge which presents an elliptical opening which prevents the sphere from falling through the lower tube but which permits liquid to drain past the sphere and through the lower tube. The drain tube is subjected to vacuum at a point above the two tubes, and the sphere is of a light weight and is elevated by the vacuum condition to thus have the sphere fluid-tightly sealed with the lower edge of the upper tube. The two tubes are of the same configuration and can be inserted into the drain tube in one motion of sliding the two tubes with the sphere therebetween. At least the upper one of the two tubes is fluid-tight with the drain tube and prevents dust and air from flowing upwardly in the drain tube, but liquid can flow downwardly in the drain tube when the sphere is down and against the lower tube.

3 Claims, 7 Drawing Figures

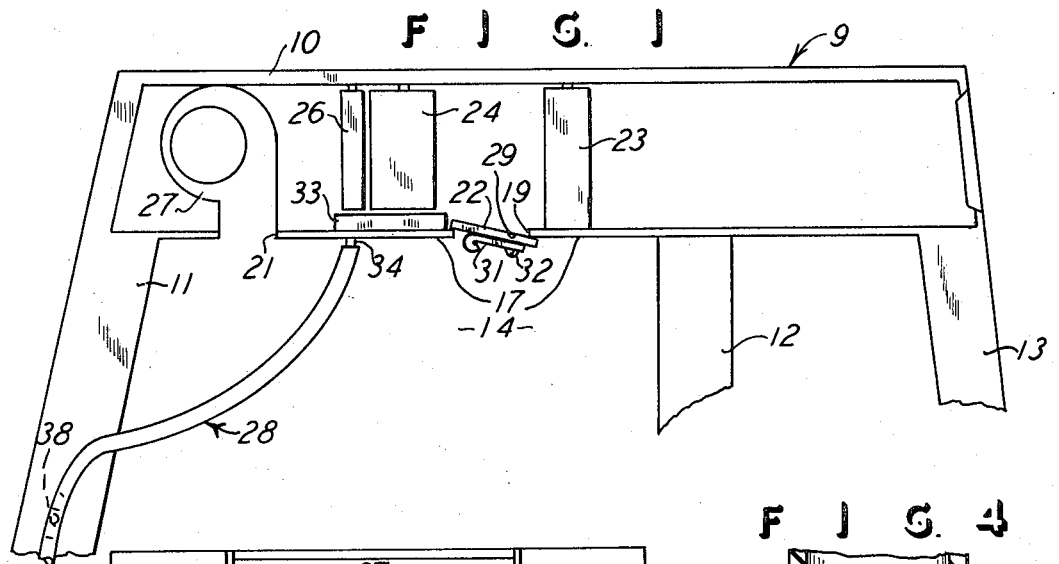
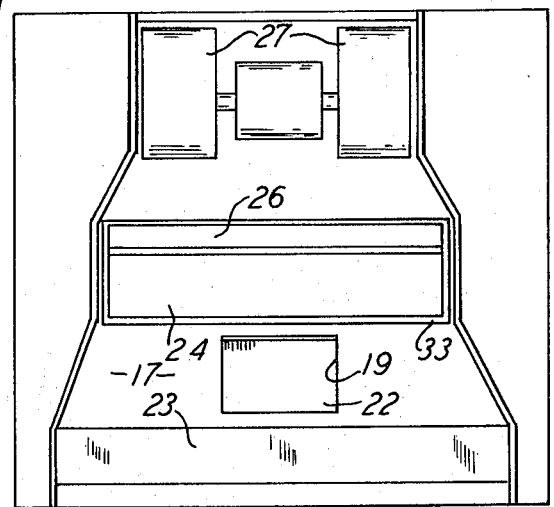
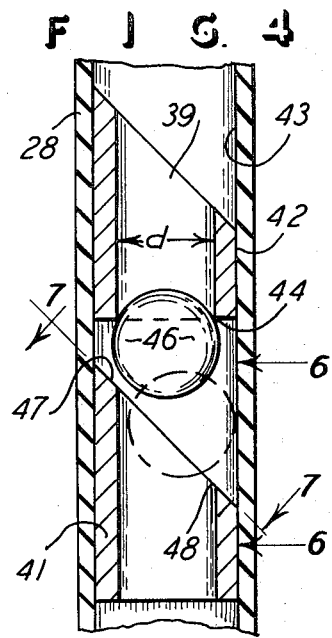
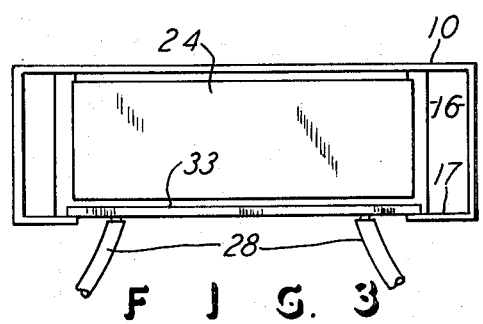
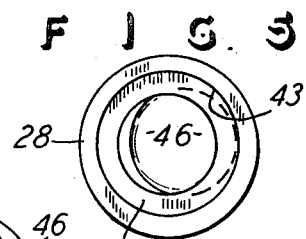
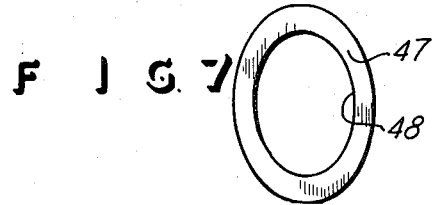
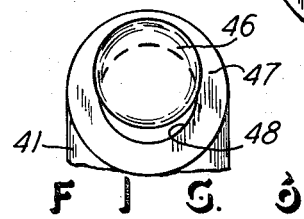

DRAIN TUBE VALVE

This invention relates to a drain tube valve, and, more particularly, it relates to a drain tube valve which is useful in preventing air from flowing upwardly in a drain tube but permitting liquid to flow downwardly in the drain tube.

BACKGROUND OF THE INVENTION

This particular invention has application in the art of air conditioning equipment for use in agricultural or industrial equipment which is commonly referred to as off-the-highway mobile equipment contrasted to passenger vehicles and highway trucks. In the present invention, the air conditioning equipment is provided in agricultural mobile equipment, such as tractors, harvesters, combines, and the like. In this type of equipment, air conditioning units are provided for cooling the operator's compartment, and the equipment is commonly operated in dusty and also in dry conditions of air. The air conditioning equipment includes an evaporator which is disposed in a compartment subject to the action of an air blower, and the compartment loses its normal atmospheric pressure and becomes a vacuum condition. Also, a drain tube commonly extends from a drain pan under the evaporator and to the exterior of the compartment so that condensate can be drained out of the compartment. However, due to the vacuum condition in the compartment, dust tends to flow through the vacuum tube and into the compartment, and such is an undesirable occurrence.

To control the entrance of dust into the air conditioning compartment, it is common practice to put a type of check valve in the drain tube so that the condensate can drain down in the tube but the dust cannot flow up the tube and into the compartment. These check valves have been of at least several different designs according to the prior art, including the liquid filled U-tube, and the reed valve and the milk valve types, for example. Also, a type of control as shown in U.S. Pat. No. 3,626,713 can be used.

However, the U-tube type of valve which requires water for its operation is not always adequately filled with water, since, for instance, when the equipment is initially operated, or when it is operated under very dry atmospheric conditions, the water is not present in the tube and thus the dust can flow into the tube and back into the air conditioning compartment. Also, the known reed valve and the known type of milk valve are subject to dust and heat affecting their performance, so that these valves are not always reliable.

Accordingly, it is an object of this invention to provide a drain tube valve which is efficient in its operation under various conditions in which it operates, and which is simple and easy to provide and maintain, and which is not affected by dust or heat. In accomplishing this particular object, the drain tube valve of this invention is sufficiently sensitive to respond to a vacuum condition in the upper end of the tube and thus close the tube against the flow of dust up into the tube, and which also permits the tube to open for the drainage of any moisture which may collect in the tube.

Additionally, it is an object of this invention to provide a drain tube valve which can be employed in mobile equipment which is commonly utilized under dusty conditions, and which requires that the valve be sensitive to a slight vacuum at one end of the valve and which also is not subjected to impairing its operation even though it is utilized in dusty conditions. In accomplishing this object, the valve is arranged with parts which are self-sealing under conditions of vacuum, to thereby prevent the flow of dusty air into the tube, and, subsequently, the valve is self-operative to open up and permit the drainage of condensate and thereby be self-cleaning in the removal of any dust collected on the valve parts.

Still another objective is to provide a drain tube valve which is simplified in its structure and which is not dependent upon precision for retaining relative positions between operating parts, and, which in fact, utilizes only a single moving part which is self-seating.

Other objects and advantages will become apparent upon reading the following description in light of the accompanying drawings.

BRIEF DESCRIPTION OF THE DRAWINGS

FIG. 1 is a diagramatic view of a portion of a vehicle cab and the air conditioning components and the drain tube and check valve of this invention.

FIG. 2 is a top plan view of a portion of the air conditioning system shown in FIG. 1.

FIG. 3 is a rear elevational view of a portion of the air conditioning system shown in FIG. 1.

FIG. 4 is an enlarged sectional view through the drain tube valve of this invention indicated in FIG. 1.

FIG. 5 is a bottom plan view of FIG. 4.

FIG. 6 is a side elevational view of FIG. 4 and being taken along the line 6—6 of FIG. 4.

FIG. 7 is a plan view being taken along the line 7—7 of FIG. 4.

DETAILED DESCRIPTION OF THE PREFERRED EMBODIMENT

A vehicle cab is designated 9 and is of a conventional nature, as shown in FIG. 1. The upper portion of the cab is shown, and it will be understood that the vehicle has a roof 10 and an upright supporting column 11, one 12, and one 13. The vehicle may be an agricultural tractor, and the details of the construction are well known to anyone skilled in the art. The cab 9 defines an operator's enclosure, designated 14, and it includes the usual side walls and floor, and the cab also defines the air conditioning compartment, designated 16. The compartment 16 is defined by the vehicle cab roof 10 and a floor 17 which is a divider between the enclosure 14 and the compartment 16. It will of course be understood that the compartment 16 is substantially air tight, except for the air inlet passage 18, permitting air to enter from outside the vehicle. Also, the compartment 16 has an inlet passage 19 and an outlet passage designated 21. The inlet passage 19 extends between the vehicle enclosure 14 and the compartment 16, so air can flow upwardly into the compartment 16, except for the control door 22 which will be described later. Also, air can flow from the compartment 16 to the enclosure 14, and such flow is through the opening 21.

The drawings further show that a conventional type of air filter 23 is disposed in the compartment 16, and an air evaporator 24 and an air heater 26 and an air blower 27 are also disposed in the compartment 16. Thus, it will be understood that air can enter the compartment 16 through the outside inlet 18, and air will then flow through the filter 23 and across the evaporator 24 and be blown by the blower 27 into the cab enclosure 14, all in a conventional manner.

The action of the blower 27 creates a slight vacuum between the blower 27 and the filter 23. This vacuum is the cause of the problems mentioned, and the special arrangement and provision of the air re-circulating door 22 and the special arrangement and provision of the drain tube, generally designated 28, serve to solve and answer the problems mentioned.

The door 22 is pivotally mounted on the compartment floor 17 by means of the trunnions 29, and the door can open relative to the passageway 19, and air can then flow from the enclosure 14 and into the compartment 16. It will be noted that the door 22 is located between the filter 23 and the blower 27, so air moving from the enclosure 14 will relieve pressure in the enclosure 14 and will also relieve the vacuum in the compartment 16. There is no problem with regard to by-passing the filter 23, since the door 22 is simply an air re-circulating door, and the air has already been cooled and filtered. Further, there is an adjustment 31 which is movably held to the door 22 by means of a screw 32, so the adjustment 31 is a counterweight which permits balancing of the door 22 about its offset trunnions 19 so that the air pressure balance between the enclosure 14 and the compartment 16 can be governed.

A condensate drain tray 33 is shown in the compartment 16 and disposed beneath the evaporator 24. Of course the air passing across the evaporator 24 will be cooled and condensate will therefore collect on the evaporator and the condensate will ultimately flow into the tray 33 and collect there. The drain tube 28 connects to a spout 34 on the bottom of the tray 33, and the condensate can be drained from the tray 33 and passed through the drain tube 28 and along the vehicle column 11 and externally of the vehicle cab 9. It will of course be understood that the compartment 16 is located overhead with regard to the operator's enclosure 14, so the drain tube 28 must be provided to dispose of the condensate at a location outside of and lower than the position of the compartment 16. However, it will be understood that the terminal end 37 of the tube 28 is exposed to atmospheric pressure, while the pressure in the compartment 16 is below atmospheric, and the condensate can therefore not readily drain through the drain tube 28.

In the present invention, the drain tube 28 has the drain tube valve disposed therein and generally designated 38. The drain tube valve has an upper tube 39 and a lower tube 41 which are shown to be of the same configuration, and both of which are shown to be cylindrical and have an inner diameter designated $d$. The tubes 39 and 41 are inserted in the drain tube 28, as clearly seen in FIG. 4, and the exterior wall 42 of the upper tube 39 is fluid-tight with the interior wall 43 of the drain tube 28. Also, it will be seen that the lower edges of both of the tubes 39 and 41 are disposed on a plane transverse to the longitudinal axis of the tubes 39 and 41, and there is a circular edge designated 44 defining the lower edge of the tube 39. A sphere 46 is disposed between the tubes 39 and 41, in the space therebetween, and the sphere is of an outer diameter which is greater than the inner diameter $d$ of the two tubes 39 and 41. Thus, the sphere 46 cannot pass through the tubes 39 and 41, but is movable between the tubes 39 and 41 and can actually move between the solid-line position and the dot-dash line position shown in FIG. 4.

In the solid-line position of the sphere 46, it will be understood that the drain tube 28 is subject to a vacuum at the upper end thereof, and the vacuum condition causes the sphere 46 to move upwardly in the drain tube 28 and to seat on the circular opening 44 and thus become fluid-tight with the tube 39. In that condition, dust and air cannot flow upwardly in the tube 28, but it will be understood that the weight of the sphere 46 was such that the slight vacuum in the tube 28 caused the sphere 46 to float upwardly and to fluid-tightly seat as described.

When condensate is generated in the air conditioning system described and commences to flow down the tube 28 and into the upper tube 39, then the sphere 46 is released from its sealing and upper position shown in FIG. 4 and it will fall to the dot-dash line position shown in FIG. 4. In that lowered position of the sphere 46, the condensate can flow past the sphere 46 and thereover and down into the lower tube 41 and out the lower end 37 of the drain tube 28, as desired. By virtue of the upper surface 47 of the lower tube 41 being at an angle oblique to the longitudinal axis of the tube 41, the sphere 46 cannot fluid-tightly seal with the lower tube 41, and thus air and liquid can flow over the sphere 46 and through the lower tube 41. Thus, the upper surface 47 presents an elliptically-shaped edge 48, only two opposite sides of which support the sphere 46 in the lowest position of the sphere 46, as shown in FIGS. 4, 5 and 6.

Therefore, the two tubes 39 and 41 are of the identical configuration and they are on the same axis and have the same inner diameter $d$, and they are spaced apart for the movement of the sphere 46 therebetween, as described. Thus, in the lowest position of the sphere 46, as shown in FIGS. 4, 5 and 6, the sphere 46 is supported on the elliptical edge 47 and also on the inner wall 43 of the drain tube 28. In that position, there is ample clearance for flow of condensate over and around the sphere 46 and out the drain tube 28. Also, in that condition, the sphere 46 is maintained in substantially axial alignment with the lower tube 41 and thus a substantial portion of the sphere 46 is subjected to the effect of the vacuum in the upper end of the tube 28 so that the sphere 46 is sensitive to the vacuum condition and is therefore highly responsive thereto and is raised to the fluid sealing position with the circular edge 44, as shown by the full-line showing of the sphere 46 in FIG. 4. Therefore, the drain tube valve is efficient in its operation and it is of a simple but reliable structure and it can be readily inserted into the drain tube 28 in one motion of inserting the three parts of the two tubes 39 and 41 and the sphere 46. Also, any dust which might accumulate on the sphere 46 can actually be flushed therefrom when the condensate is being drained through the tube 28, and thus the efficiency of fluid-tightly sealing is retained during the extended use of the drain tube valve described herein. In this arrangement, the drain tube 28 can be of a flexible material, such as a rubber or plastic material, and the tubes 39 and 41 are preferably of a substantially rigid material for maintaining the desired cylindrical and circular configurations described. Thus, the tubes 39 and 41 are pressed into the drain tube 28 and are simply held therein by a slight stretching of the tube 28 or by friction itself. It will be further noted that the check valve 38 itself is inserted in the tube 28 and is thus spaced from the very end 37 of the tube and therefore is not directly subjected to dust and light contamination, compared to other valves which are commonly located at the very end of the drain tube.

What is claimed is:

1. A drain tube valve comprising an uprightly disposed drain tube which is subjected to liquid draining therethrough and a vacuum condition at the upper end of the drain tube, two tubes disposed inside said drain tube and being axially aligned and spaced apart along said drain tube, a sphere disposed in the space between said two tubes and being of a diameter greater than the inner diameter of said two tubes and less than the inner diameter of said drain tube to be freely movable in said drain tube between said two tubes, the upper one of said two tubes being fluid-tight with said drain tube except for the opening through said upper one of said two tubes at the inner diameter thereof and with said opening being defined by a circular edge for fluid-tight nesting of said sphere with said upper one of said two tubes in response to a vacuum condition at the upper end of said drain tube and to thereby preclude the upward flow of air through said drain tube, the spacing between said two tubes being sufficient to have said sphere be spaced from said upper one of said two tubes when liquid is draining in said drain tube, and the lower one of said two tubes having its upper edge which is adjacent said sphere disposed at an oblique angle relative to the longitudinal axis of said lower tube, to thereby present an elliptically-shaped edge toward said sphere and with the smaller dimension across the ellipse being smaller than the diameter of said sphere.

2. The drain tube valve as claimed in claim 1, wherein said two tubes have the same inner diameter, and said circular edge of said upper one of said two tubes is its lower inner edge and is disposed on a plane transverse to the axis of said upper tube.

3. The drain tube valve as claimed in claim 1, wherein said two tubes are identical in configuration and have their respective upper ends disposed on a plane oblique to their axes, and have their respective lower ends disposed on a plane transverse to their axes, to have said upper tube present its said circular edge toward said sphere, and to have said lower tube present its said elliptically-shaped edge toward said sphere.

* * * * *